United States Patent Office 3,285,890
Patented Nov. 15, 1966

3,285,890
CATALYSTS FOR POLYMERIZATION
Victor D. Aftandilian, Watertown, Mass., assignor to Cabot Corporation, Boston, Mass., a corporation of Delaware
No Drawing. Filed Sept. 9, 1963, Ser. No. 307,347
20 Claims. (Cl. 260—82.1)

This invention relates to the polymerization and copolymerization of mono-olefins and/or di-olefins such as ethylene, propylene, butene-1, styrene, isoprene and butadiene and includes within its scope improved catalysts for the polymerization of the aforementioned classes of monomers.

It is a principal object of the present invention to provide a process for the polymerization of mono-olefins, di-olefins and mixtures thereof.

It is another object of this invention to provide novel catalysts for the polymerization of mono-olefins, di-olefins and mixtures thereof.

Other objects of this invention will in part be obvious and will in part appear hereinafter.

Catalyst components suitable for use in the polymerization and copolymerization of mono- and di-olefins have been disclosed, for instance, in U.S. applications Serial No. 278,414, filed May 6, 1963 (a continuation of Serial No. 2,861, filed January 18, 1960) and Serial No. 21,110, filed April 11, 1960, all now abandoned, both by Orzechowski and MacKenzie. Said components or cocatalysts comprise the product of the metathetical reaction carried out under certain conditions between a halide type compound of a Group IVa, Va and VIa metal and hydroxyl groups on the surface of a finely-divided particulate inorganic solid. In accordance with the present invention, it has been discovered that excellent polymerization catalysts are obtained when said cocatalysts are combined, under suitable conditions, with certain organometallic compounds comprising Group Vb metals, i.e., arsenic, bismuth or antimony.

The polymerization and copolymerization of the mono- and/or di-olefins can be effected as suitable temperatures within the range of from about —25° C. to about 250° C., and pressures ranging upwardly from about atmospheric pressures to any desired maximum pressure, for example, 30,000 p.s.i.g. or even higher pressures.

Inorganic solids suitable for producing the cocatalysts of the present invention generally include any inorganic solid which is available in finely-divided particulate form with hydroxyl groups on the surface thereof. For example, oxides such as alumina, zirconia and silica, silicates such as chrysotile, and aluminates such as corundum are all generally suitable for the purposes of the present invention. For best results, however, (as explained in detail in said copending application Serial No. 278,414) inorganic solids having an average particle diameter of less than about 0.1 micron and a hydroxyl group concentration on the surface thereof of at least about $1 \times 10^{-4}$ equivalents per gram of solid are definitely preferred.

Halide-type compounds of Group IVa, Va or VIa (hereinafter generally referred to as transition metal halides) suitable for producing the cocatalysts of the present invention, are compounds conforming to the general empirical formula $$TO_aX_b$$

wherein T is a metal of Groups IVa, Va or VIa (where the group numbers correspond to the Mendeleev Periodic System); O is oxygen; $a$ is a number from 0 to 2; each X is any halogen; and $b$ is a number from 1 to 6.

Examples of suitable compounds conforming to the general formula $$TO_aX_b$$

are halides of Groups IVa, Va and VIa metals such as titanium tetrachloride, zirconium tetrachloride, vanadium tetrachloride and titanium tetraiodide, and oxyhalides such as vanadium oxychloride and chromium oxychloride.

The conditions under which reaction between the transition metal halides and hydroxyl groups on the surface of the finely-divided inorganic solid can be accomplished are subject to considerable variation as explained in detail in Serial No. 278,414, for example. However, in order to obtain a cocatalyst with exceptionally high activity and reproducible character it has been found to be all important that the finely-divided inorganic solid be essentially dry and anhydrous (i.e. free of molecular water in any form) at the time it is brought into contact with the transition metal halide. In addition, it is recommended that said reaction be achieved so as to allow byproducts of the reaction (for example, HCl) to be eliminated from the reaction zone in order to insure that said reaction goes to completion. Generally, said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking, almost any temperature between about 0° C. and about 300° C. is generally definitely preferred. Assuming provision is made for intimate contact of the dry inorganic solid and the transition metal halide, the minimum time required to accomplish the chemical reaction needed will vary from periods of about 10 hours at room temperature to periods of about 15 minutes at temperatures of 100° C. or over. Temperatures higher than about 300° C., e.g. 500° C., are completely needless and therefore of little or no interest.

The catalysts of the present invention are formed when the cocatalyst products of the metathetical reaction (as described above) of hydroxyl groups in the surface of an inorganic solid and a transition metal halide are combined in an inert environment with an organometallic compound at temperatures normally between about 0° C. and about 150° C. and at atmospheric pressure, although higher temperatures and pressures can be utilized. The temperatures and/or pressures that are most desirably utilized with any particular combination of components can be readily determined bearing in mind that temperatures and/or pressures that cause substantial decomposition of either of the components of the catalyst should be avoided.

Organometallic compounds suitable for the purposes of the present invention are those compounds conforming to the empirical formula $$R_pH_tM$$

wherein each R is chosen from the group consisting of monovalent hydrocarbon radicals, monovalent alkoxy radicals, monovalent aryloxy radicals and the halogens; $p$ is a number from 0 to 2; each H is a hydride radical; $t$ is a number from 1 to 3; and M is a metal of Group Vb.

Specific examples of R groups for substitution in the above formula include methyl, 2-methyl-2-butenyl, n-dodecyl, 4-cyclohexylethyl, methylnaphthylethyl, 2,2,1-bicycloheptyl, tolyl, xylyl, xenly, methoxy, isobutoxy, n-octyloxy, phenoxy and 1,2-naphthoxy.

Specific examples of compounds conforming to the formula:

$$R_pH_tM$$

which are suitable for the purposes of the preset invention are monomethylarsine—$CH_3AsH_2$;
monoethoxyarsine—$C_2H_5OAsH_2$;
dimethylarsine—$(CH_3)_2AsH$;
mono-i-propylarsine—$i-C_3H_7AsH_2$;
di-i-butoxyarsine—$(i-C_4H_8O)_2AsH$;
ethoxypropoxyarsine—$C_2H_5O(C_3H_7O)AsH$;
diphenylarsine—$(C_6H_5)_2AsH$;
dimethylbismuthine—$(CH_3)_2BiH$;
diphenylbismuthine—$(C_6H_5)_2BiH$;
monomethylstibine—$CH_3SbH_2$;
monobutoxystibine—$C_4H_9OSbH_2$;
dipentoxystibine—$(C_5H_{11}O)_2SbH$;
diphenylstibine—$(C_6H_5)_2SbH$;
trimethylchlorostibane—$(CH_3)_3HSbCl$;
and the like.

Using the catalysts of this invention, polymerization of mono-olefin and/or di-olefin monomers can be accomplished in the absence of liquids other than the monomers themselves), solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are generally suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also, members of the aromatic hydrocarbon series, such as isopropyl benzene, ethyltoluene, hemimellitene, pseudocumene, isodurene, isoamylbenzene, and particularly the mononuclear aromatic hydrocarbons such as xylene, mesitylene and xylene-p-cymene mixtures, and the like are completely suitable.

The proportion of surface-reacted particulate inorganic solid to organometallic compound utilized in preparing the catalysts is not usually a critical feature of the process. We have found from experience that a molar ratio of from about 0.1 to about 5 millimoles of the organometallic compound per milliatom of transition metal chemically combined with the surface of the finely-divided solid is to be preferred.

The quantity of catalyst, i.e. comprising both the surface-reacted particulate inorganic solid and the organometallic compound, to be utilized in the polymerization reaction may vary, but in general, the total quantity of catalyst that need be employed based on the weight of the charging stock is very small particularly when a very fine particle size oxide (i.e. having an average particle diameter of less than about 0.05 micron) is utilized as the inorganic solid.

The contact time or space velocity employed in the polymerization process variables such as the particular catalyst utilized, the specific type of product desired, and the extent of monomer conversion desired in any given run or pass over the catalyst. In general, this variable is readily adjustable to obtain the desired results.

There follow a number of illustrative non-limiting examples:

*Example 1*

To a 2000 milliliter, three neck, glass reaction vessel equipped with stirrer, a condenser and nitrogen inlet and outlet tubes, there is added 20 grams of "Cab-O-Sil," a pyrogenic silica produced by Cabot Corporation, which has an average particle diameter of 10 millimicrons and a hydroxyl group content on the surface thereof of about 1.5 milliequivalents per gram. To said reaction vessel there is added 1650 milliliters of benzene and the resulting translucent slurry is dried by being heated to, and maintained at, the boiling point of benzene, i.e. about 80° C., for about 20 hours during which time a water/benzene azeotrope is removed from the reaction vessel by periodic distillation until about 450 milliliters of distillate has been removed. The vessel is then cooled and charged with 20 millimoles of titanium tetrachloride. The resulting slurry is then refluxed for about 7 hours with continuous stirring while being swept by a stream of dry nitrogen. Subsequently, the extent of the reaction between the titanium tetrachloride and the hydroxyl groups on the silica is determined by measuring the quantity of HCl that was produced and by testing the liquid contents of the vessel for the absence therein of titanium tetrachloride, and the said silica is found to have about 20 milliatoms of titanium chemically bound to the surface thereof. A sample of 60 milliliters of this slurry containing about 1 milliatom of titanium bound to the surface of about 1 gram of silica, is then transferred from this reaction vessel to a 1000 cc. stainless steel bomb which has been previously flushed with dry nitrogen. Next, 3 millimoles of diphenylbismuthine is added to the bomb and the bomb is pressurized to 1200 p.s.i.g. with ethylene. The bomb is then continuously agitated and heated to, and maintained at, about 80° C. for about 4 hours while the pressure therein is maintained at about 1200 p.s.i.g. by the intermittent introduction of additional ethylene. The reaction products are analyzed and it is found that about 125 grams of solid polymer have been produced.

*Example 2*

To a 2000 milliliter stainless steel, stirred autoclave there is introduced 60 milliliters of the cocatalyst slurry produced in Example 1 which contains about 1 milliatom of titanium bound to the surface of about 1 gram of silica. Next, there is introduced into the autoclave about 750 milliliters of anhydrous benzene and 3 millimoles of dibutoxystibine. The autoclave is heated to, and maintained at, about 50° C. with continuous stirring for about 1 hour. Said autoclave is then heated to, and thereafter maintained at, about 80° C. and there is introduced thereinto 200 millimoles of inhibitor free styrene and 200 millimoles of ethylene. After 24 hours of continuous stirring, the solid product is analyzed and it is found that a styrene-ethylene copolymer has been produced.

*Example 3*

To a 4000 milliliter, three neck, glass reaction vessel there is added 10.6 grams of "Alon," a pyrogenic alumina produced by Deutsche Gold- und Silber-Scheideanstalt vormals Roessler which has an average particle diameter of about 10–40 millimicrons and a hydroxyl group content on the surface thereof of about 0.7 milliequivalent per gram. Next, there is added 1500 milliliters of toluene and the resulting slurry is heated to, and maintained at, refluxing temperature, about 110.6° C., for 14 hours while a toluene/water azeotrope is periodically distilled off until about 500 milliliters of distillate have been removed. The vessel and contents are cooled and there is then introduced thereinto 4 millimoles of vanadium oxychloride. The contents of the vessel are thereafter continuously stirred, and maintained at refluxing temperature for about 10 hours while the gas phase is continuously swept by a stream of dry nitrogen. Subsequently, the extent of the reaction between the vanadium oxychloride and the alumina is determined by measuring the quantity of HCl removed from the vessel by the nitrogen stream, and by testing the liquid contents of the vessel for the absence therein of vanadium oxychloride and the said alumina is found to contain 4 milliatoms of vanadium bound to the surface of said alumina. To a 2000 milliliter, stainless steel, stirred autoclave there is introduced 500 milliliters of said cocatalyst slurry which contains about 2 milliatoms of vanadium chemically bound to the surface of about 5.3 grams of alumina. Next, there is added to said vessel 7 millimoles of dimethylbismuthine dissolved in about 200 milliliters of anhydrous toluene. The autoclave is thereafter maintained at about 95° C. and there is then introduced thereinto propylene gas to a total pressure of about 500 p.s.i.g. After about 8 hours of continuous agitation the solid product of the reaction is analyzed and it is found that solid polypropylene has been produced.

*Example 4*

To a 2000 milliliter, three neck, glass reaction vessel there is added 20 grams of "Alon" and 1500 milliliters of benzene and the resulting slurry is dried azeotropically for about 20 hours until about 500 milliliters of a water/benzene azeotrope have been removed. The vessel is then cooled to ambient temperature and charged with about 9 millimoles of chromium oxychloride. The resulting slurry is then refluxed at about 80° C. for about 10 hours with continuous stirring while being swept by a stream of dry nitrogen. Subsequently, the extent of reaction between the chromium oxychloride and the hydroxyl groups on the surface of the alumina is determined by measuring the quantity of HCl that was produced and by testing the liquid contents of the vessel for the absence therein of chromium oxychloride and the said alumina is found to have 9 milliatoms of chromium chemically bound to the surface thereof. A 333 milliliter portion of this slurry containing about 3 milliatoms of chromium bound to the surface of about 6.7 grams of alumina is then transferred, without exposure to the atmosphere, to a 1000 milliliter stainless steel, reaction bomb. Next, 6 millimoles of diethoxystibine and 800 millimoles of 1,3-butadiene are charged to said bomb and the bomb is then heated to and maintained at about 80° C. with continuous agitation for about 8 hours. The reaction products are analyzed and it is found that solid polybutadiene has been formed.

The polymers produced by the process of this invention can be subjected to such aftertreatment as may be desired to fit them for particluar uses or to impart desired properties. Thus, the polymers can be extruded, mechanically milled, filmed or cast, or converted to sponges or latices. Also, antioxidants, stabilizers, fillers such as carbon black or additional silica; extenders, plasticizers, pigments, insecticides, fungicides, etc, can be incorporated into the polymers.

Obviously, many changes can be made in the above-described examples and procedure without departing from the scope of the invention. For example, although only transition metal chlorides are mentioned in the above examples, transition metal bromides, iodides and fluorides are also suitable for the purposes of the present invention. For example, vanadium pentabromide is entirely suitable.

Also, pyrogenically coformed, or coprecipitated metal oxides, or metal oxides coformed with, or mixed with, other compounds are suitable for the purposes of the present invention.

Accordingly, it is intended that the above disclosure be regarded as illustrative and as in no way limiting the scope of the invention.

What I claim is:

1. A process of polymerizing a substance chosen from the group consisting of mono-olefins, mixtures of mono-olefins, di-olefins, mixtures of di-olefins and mixtures thereof which comprises contacting said substance at temperatures between about −25° C. and about 250° C., with a catalyst comprising (a) a finely-divided inorganic solid carrying in chemical combination surface structures chosen from the group consisting of:

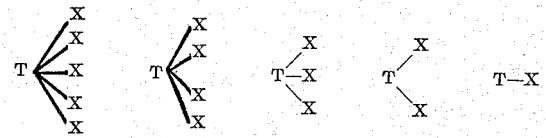

wherein T is chosen from the group consisting of the metals of Groups IVa, Va and VIa; each X is any halogen; and where said structures are chemically linked directly from T to at least one oxygen atom in the surface of said solid; and (b) an organometallic compound chosen from the group consisting of compounds conforming to the empirical formula $$R_pH_tM$$

wherein each R is any monovalent radical chosen from the group consisting of hydrocarbon radicals, alkoxy radicals, aryloxy radicals and any halogen; p is a number from 0 to 2; each H is hydrogen; T is a number from 1 to 3; and M is a metal of Group Vb.

2. The process of claim 1 wherein said surface structures chemically combined to the surface of said inorganic solid comprise

wherein each T is a metal of Group IVa and each X is chlorine.

3. The process of claim 1 wherein said surface structures chemically combined to the surface of said inorganic solid comprise

wherein each T is a metal of Group IVa and each X is chlorine.

4. A process for polymerizing a substance chosen from the group consisting of a mono-olefin, mixtures of mono-olefins, a di-olefin, mixtures of di-olefins, and mixtures thereof which comprises contacting said substance at temperatures between about −25° C. and 250° C., with a catalyst comprising (1) the product of a metathetical reaction between
        (a) a compound conforming to the formula $$TO_aX_b$$

wherein T is a metal chosen from the group consisting of Groups IVa, Va and VIa; O is oxygen; a is a number from 0 to 2; each X is any halogen; and b is a number from 1 to 6; and
        (b) hydroxyl groups in the surface of a particulate finely-divided inorganic solid, where, in said product, the valence state of T is the same as in said compound but at least one less halogen atom is attached to T than was attached thereto in said compound, and
    (2) a compound conforming to the formula $$R_pH_tM$$

wherein each R is any monovalent radical chosen from the group consisting of hydrocarbon radicals, alkoxy radicals, aryloxy radicals and any halogen; p is a number from 0 to 2; each H is hydrogen; t is a number from 1 to 3; and M is a metal of Group Vb.

5. The process of claim 4 wherein each X in the formula $$TO_aX_b$$

is chlorine.

6. The process of claim 4 wherein said compound conforming to the formula $$TO_aX_b$$

is a Group IVa compound.

7. The process of claim 4 wherein said compound conforming to the formula $$TO_aX_b$$

is titanium tetrachloride.

8. The process of claim 4 wherein said compound conforming to the formula $$TO_aX_b$$

is a vanadium compound.

9. The process of claim 4 wherein said compound conforming to the formula $$TO_aX_b$$

is a chromium compound.

10. The process of claim 4 wherein the substance to be polymerized is an α-mono-olefin.

11. The process of claim 4 wherein in the substance to be polymerized is a di-olefin having a double bond in the alpha position.

12. The process of claim 4 wherein in the formula $$R_pH_tM$$

$p$ is 2; $t$ is one; and each R is an alkyl group.

13. The process of claim 4 wherein said inorganic solid is chosen from the group consisting of pyrogenic silica and alumina having an average particle diameter of less than about 50 millimicrons and a hydroxyl group concentration on the surface thereof of at least about $7 \times 10^{-4}$ equivalents per gram.

14. The process of claim 4 wherein in the formula $$R_pH_tM$$

each R is a hydrocarbon radical.

15. The process of claim 4 wherein in the formula $$R_pH_tM$$

M is bismuth.

16. The process of claim 4 wherein in the formula $$R_pH_tM$$

M is antimony.

17. The process of claim 4 wherein in the formula $$R_pH_tM$$

M is arsenic.

18. A catalyst comprising
(a) a finely-divided inorganic solid carrying in chemical combination surface structures chosen from the group consisting of:

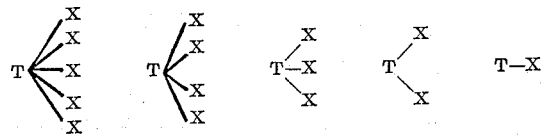

wherein T is chosen from the group consisting of the metals of Groups IVa, Va and VIa; each X is any halogen; and where said structures are chemically linked directly from T to at least one oxygen atom in the surface of said solid; and (b) an organometallic compound chosen from the group consisting of compounds conforming to the formula $$R_pH_tM$$

wherein each R is any monovalent radical chosen from the group consisting of hydrocarbon radicals, alkoxy radicals, aryloxy radicals and any halogen; $p$ is a number from 0 to 2; each H is hydrogen; $t$ is a number from 1 to 3; and M is a metal of Group Vb.

19. The catalyst of claim 18 wherein said inorganic solid is chosen from the group consisting of pyrogenic silica and alumina having an average particle diameter of less than about 50 millimicrons and a hydroxyl group concentration on the surface thereof of at least $7 \times 10^{-4}$ equivalents per gram.

20. The catalyst of claim 18 wherein in the formula $$R_pH_tM$$

$p$ is 2; $t$ is one; and each R is an alkyl group.

No references cited.

JOSEPH L. SCHOFER, *Primary Examiner.*

L. EDELMAN, *Assistant Examiner.*